United States Patent [19]

Chasteen

[11] Patent Number: 4,744,701
[45] Date of Patent: May 17, 1988

[54] DRUM UNLOADER

[75] Inventor: Thomas A. Chasteen, Indianapolis, Ind.

[73] Assignee: Ransburg Corporation, Indianapolis, Ind.

[21] Appl. No.: 928,318

[22] Filed: Nov. 7, 1986

[51] Int. Cl.[4] .............................................. B65G 53/34
[52] U.S. Cl. ....................... 406/39; 406/140; 414/421; 414/422; 222/166; 222/185
[58] Field of Search ................. 414/422, 423, 403; 406/73, 91, 52, 38, 39; 222/164–166, 185

[56] References Cited

U.S. PATENT DOCUMENTS

| 481,873 | 8/1892 | Sardy | 222/166 X |
|---|---|---|---|
| 1,599,751 | 9/1926 | Franken et al. | 414/421 X |
| 3,013,684 | 12/1961 | King et al. | 414/422 X |
| 3,777,920 | 12/1973 | Wiese | 414/421 |
| 4,095,707 | 6/1978 | Kowtko | 414/421 X |
| 4,354,776 | 10/1982 | Matsui | 406/52 X |
| 4,505,623 | 3/1985 | Mulder | 406/134 X |
| 4,618,306 | 10/1986 | Dorsch | 414/422 X |

FOREIGN PATENT DOCUMENTS

| 2257517 | 8/1975 | France | 414/403 |
|---|---|---|---|
| 7811885 | 6/1980 | Netherlands | 414/422 |

Primary Examiner—Joseph F. Peters, Jr.
Assistant Examiner—James M. Kannofsky
Attorney, Agent, or Firm—Barnes & Thornburg

[57] ABSTRACT

A drum- or barrel-unloader comprising a stand for supporting a drum or barrel in right side up and inverted orientations, and an elevator for engaging the stand. The stand includes a hopper for receiving the drum contents when the drum is inverted. The hopper is mounted for both gross and fine adjustment between a first position away from the top of the drum, and a second position in engagement with the top of the drum. Gross adjustment of the hopper is provided by inserting an apparatus into aligned holes in two slidably engaged channel sections. Fine adjustment of the hopper is provided by a threaded apparatus on each of two threaded studs, each of which extend from an end of a channel section and are inserted into an apparatus for providing holes on generally opposite sides of the hopper. For fine adjustment the threaded apparatus are loosened and tightened on the threaded studs against the apparatus for providing holes. The elevator comprises first and second frame portions. Upon actuation of a jack between the two portions at least one block on either the elevator or the stand engages at least one trunion on the other of either the elevator or the stand to suspend the stand pivotally from the elevator so it may be inverted. Disengagement of the elevator leaves the stand and drum supported therein in an inverted orientation. The hopper is provided with a material transfer pump and a vent with a filter.

14 Claims, 3 Drawing Sheets

DRUM UNLOADER

This invention relates to drum- and barrel-unloaders. It is particularly useful in drum-unloaders for unloading grannular or pulverulent materials such as coating powders.

Unloaders for withdrawing powdered coating material from drums containing such material are known. There is, for example, the system illustrated in U.S. Pat. No. 4,505,623. The system of that patent includes a mechanism for suspending the drum to be unloaded with its cylindrical axis tilted at an approximately 45° angle from vertical, two tubes for insertion into an opening provided through the top of the drum, and a vibrator for actuation in contact with the cylindrical sidewall of the drum. The vibrator vibrates powdered coating material which clings to the interior of the drum down to the lowest point in the tilted drum. The two tubes project down through the opening into proximity with this lowest point in the tilted drum and form the pickup mechanism for the powered coating material. All in all, the system of that patent is somewhat complex and expensive.

It is an object of the present invention to provide a system for unloading powdered coating material from a drum containing such material.

According to the invention, a drum- or barrel-unloader comprises a stand for supporting the drum or barrel in right side up and inverted orientations. The stand includes a hopper for receiving the drum's or barrel's contents when the drum or barrel is inverted with its lid open, and means for mounting the hopper for adjustment between first and second positions. In the first position, the hopper is away from the top of the drum or barrel to permit placement of the drum or barrel in, and removal of the drum or barrel from, the stand. In the second position, the hopper is in engagement with the top of the drum or barrel to receive the contents of the drum or barrel when the drum or barrel is placed in the stand and inverted. The unloader further comprises an elevator for engaging and raising the stand. One of the stand and elevator comprises at least one trunnion. The other of the stand and elevator comprises at least one block for engaging the at least one trunnion. Operation of the elevator causes the engagement of the at least one trunnion and the at least one block to suspend the stand pivotally from the elevator so that the stand and the drum or barrel supported by the stand can be inverted. Subsequent disengagement of the elevator leaves the stand, and the drum or barrel supported therein, in inverted orientation.

Additionally according to an illustrative embodiment, the one of the stand and elevator comprising at least one trunnion comprises two generally coaxial trunnions. The one of the stand and elevator comprising at least one block for engaging the at least one trunnion comprises a block for engaging each of the two generally coaxial trunnions. Illustratively, the stand comprises the two coaxial trunnions and the elevator comprises the two blocks.

Further according to an illustrative embodiment, the elevator comprises a first frame portion and a second frame portion, and means for pivotally mounting the second frame portion relative to the first frame portion. The pivotal mounting means comprises means defining a generally horizontally extending pivot axis about which the second frame portion pivots relative to the first frame portion. The elevator further comprises means for mounting the one of the trunnion and the block for engaging the trunnion which is mounted on the elevator from the second frame portion, a jack, and means for mounting the jack between the first and second frame portions. Actuation of the jack in a first direction pivots the second frame portion relative to the first to elevate the one of the trunnion and the block for engaging the trunnion mounted on the second frame portion. Actuation of the jack in a second direction pivots the second frame portion relative to the first to lower the one of the trunnion and the block for engaging the trunnion mounted on the second frame portion.

Additionally, according to an illustrative embodiment, the means for mounting the hopper on the stand for adjustment between the first and second positions includes first means for providing gross adjustment of the hopper and second means for providing fine adjustment of the hopper. Illustratively, the means for providing gross adjustment of the hopper comprises a first channel section and a second channel section slidably engaging the first channel section. At least one of the first and second channel sections includes a plurality of spaced holes and the other of the first and second channel sections includes a hole for alignment with a selected one of the spaced holes. Means are provided for insertion into the aligned holes in the first and second channel sections to permit gross adjustment of the hopper. Illustratively, the means for providing gross adjustment of the hopper comprises two first channel sections and two second channel sections, each second channel section slidably engaging a respective first channel section, means for mounting each first channel section on the stand and means for mounting the second channel sections generally on opposite sides of the hopper.

Further, illustratively, the means for providing fine adjustment of the hopper comprises two threaded studs, means for mounting each threaded stud to extend from an end of a respective second channel section adjacent the hopper, and means providing a hole on each of the generally opposite sides of the hopper. The threaded studs are sized for insertion into the holes provided on the generally opposite sides of the hopper. Threaded means, such as handwheels, are provided for engaging each stud. Loosening and tightening of the threaded means on the studs against the means providing the holes on generally opposite sides of the hopper provides the fine adjustment of the hopper.

Additionally according to an illustrative embodiment of the invention, the hopper comprises means defining an opening through a wall thereof. A transfer pump is provided for transferring material from the hopper. Means are provided for coupling the transfer pump through the opening to the interior of the hopper, as are means for actuating the transfer pump to transfer material from the hopper.

Additionally, according to an illustrative embodiment, the apparatus further comprises means defining a vent through a wall of the hopper, the vent for venting atmospheric pressure to the interior of the hopper.

Further according to an illustrative embodiment, the apparatus further comprises a filter for permitting air flow and inhibiting material flow and means for coupling the filter to the vent. The filter prevents material flow out of the hopper through the vent.

The invention may best be understood by referring to the following description and accompanying drawings which illustrate the invention. In the drawings.

Figure 3:
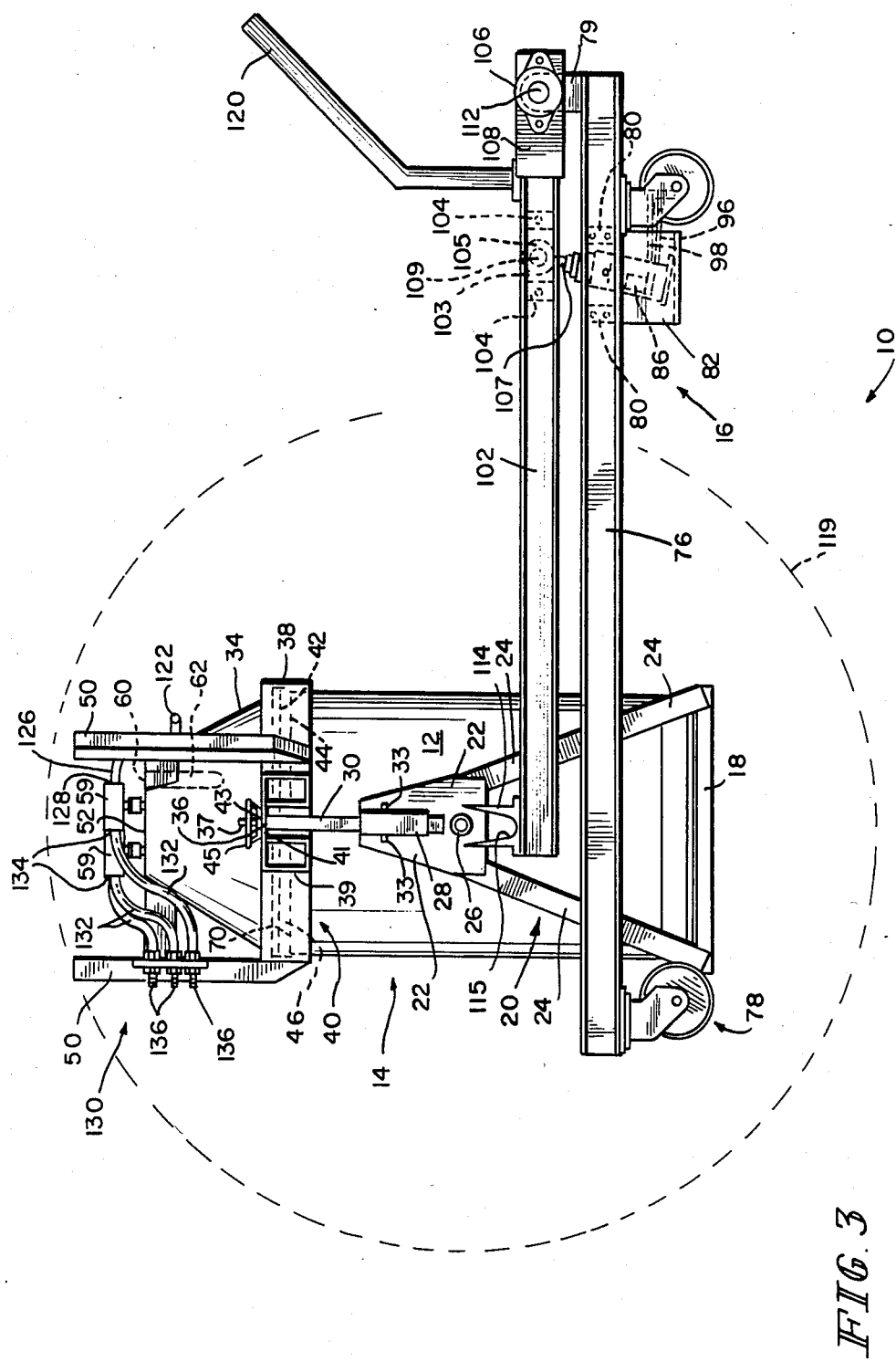

Referring now to the drawings, a drum unloader 10 for unloading powdered coating material from drums such as drum 12 includes a drum stand portion 14 and an elevator portion 16. Drum stand portion 14 includes a generally rectangular drum rest platform 18. A triangular frame structure 20 (best illustrated in FIG. 3) extends vertically upward from each of two opposite sides of platform 18. Gusset plates 22 are provided on both sides of the two side legs 24 of each triangular frame 20 at the junction of legs 24. A trunnion 26 extends through both gusset plates 22. The trunnions 26 are coaxial and extend away from each other.

Figure 2:
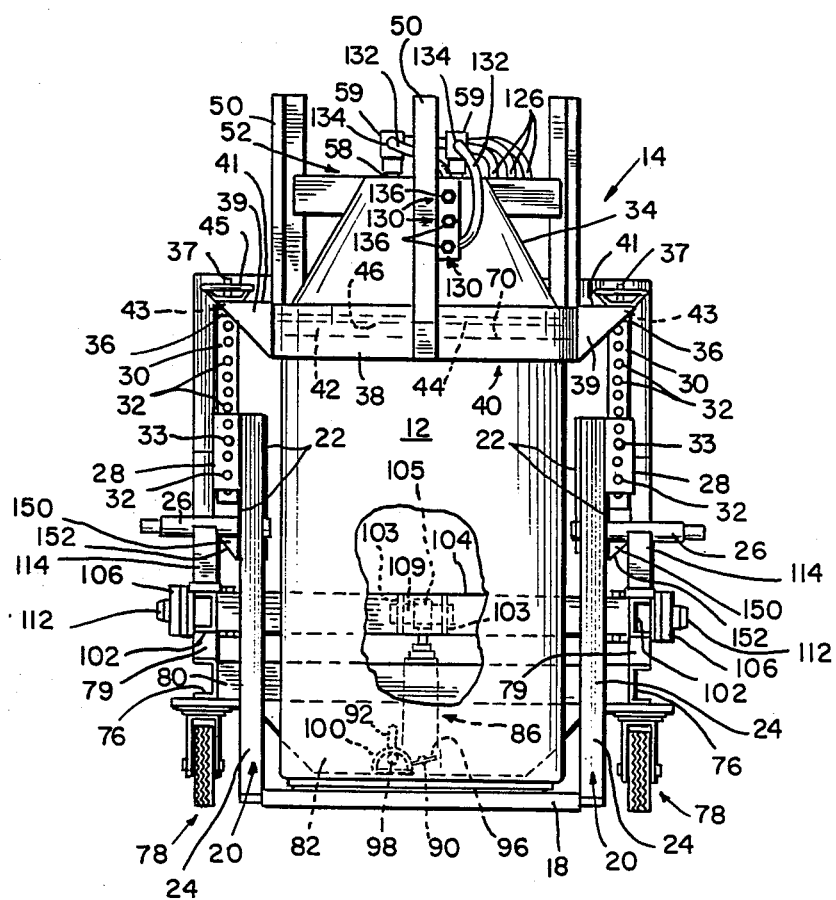
FIG. 2 illustrates an end elevational view, partly in phantom, of the system of FIG. 1; and, FIG. 3 illustrates a side elevational view, partly in phantom, of the system of FIGS. 1–2.

A section 28 of square cross section channel extends vertically upward above each trunnion 26 from gusset plate 22. A second section 30 of square cross section channel slidably engages each section 28. Section 28, 30 are provided with series of vertically spaced holes 32 (illustrated in FIG. 2) which can be aligned to permit the passage of bolts 33 through the aligned holes to adjust the height to which sections 30 extend. The top 36 of each section 30 is provided with an upstanding threaded stud 37. A hopper 34 is supported from the tops 36 of sections 30 by inverted, generally U-shaped cross-section ears 39 which extend radially outward from diametrically opposite locations on hopper 34. Each ear 39 includes a flat web portion 41 provided with a hole 43 through which a respective one of studs 37 extends. A handwheel 45 (only illustrated in FIG. 3) is threaded onto each of studs 37 and can be adjusted to provide the desired amount of longitudinal play of hopper 34 along studs 37.

Hopper 34 is generally frustoconical in configuration, but includes a right circular cylindrical flange 38 at its larger end 40. A seat 42 extends generally radially inwardly perpendicular to flange 38 to join the sidewall of the larger end 40 of the frustoconical hopper 34. The inner surface 44 of seat 42 is lined with a strip of resilient sealing material 46 all the way around its circumference. The diameter across the flange 38 of hopper 34 is slightly larger than the diameter of a standard 55-gallon drum 12, the size of drum in which powdered coating material is typically packaged, shipped and stored.

Hopper 34 is provided with three equally angularly spaced vertically extending legs 50. The small end 52 of hopper 34 is provided with four openings 54, 56, 58, 60, three 54, 56 and 58 of which are fitted with air driven powdered material transfer pumps 59, such as the model GR 86396 transfer pump available from Ransburg Electrostatic Equipment, Inc., P.O. Box 88220, Indianapolis, Ind. 46208. Pumps 59 are coupled to the interior of hopper 34 to transfer powdered coating material from it. The fourth, 60, of these openings is fitted with a conventional compressed air muffler 62 such as the part number 20401-05 air muffler available from Ransburg Electrostatic Equipment, Inc. The muffler 62 extends inwardly into the frustum of a cone defined within hopper 34 while transfer pumps 59 are fitted to the outside of hopper 34.

In operation, the bolts 33 are removed from the aligned holes 32 in sections 28, 30 and the hopper 34 and its adjuncts are removed from the drum stand 14. The drum 12 of powdered coating material is then placed on platform 18. The lid is removed from drum 12. Hopper 34 and its adjuncts are then replaced on sections 28 and the bolts 33 replaced in aligned holes 32. The handwheels 45 are tightened uniformly on their respective studs 37 to cause the upper lip 70 of the drum 12 to compress the sealing material 46 uniformly and seal the hopper 34 onto the drum 12.

Turning now to the elevator portion 16, it includes a lower pair of generally horizontally extending, generally C-shaped cross-section, parallel frame rails 76. Each end of each frame rail 76 is provided with a pivotally mounted caster 78 to permit easy maneuvering of the elevator portion 16. Each frame rail 76 is also provided with an upstanding ear 79 (best illustrated in FIG. 3) at one of its ends. Frame rails 76 are joined by a pair of transversely extending ladder rails 80 which extend between rails 76. A jack mounting housing 82 is supported between rails 80. A 6000 pound capacity hydraulic bottle jack 86 is mounted in jack mounting housing 82 generally centrally between rails 76 and extends upward between rails 80. Openings 90, 92 (FIG. 2) are provided through a sidewall 94 of housing 82 for the direction switch 96 and pump handle 98, respectively, of jack 86. The end of pump handle 98 is provided with a stirrup 100 into which the operator can insert his foot to pump the jack 86.

Elevator portion 16 further includes an upper pair of generally C-shaped cross-section, generally parallel frame rails 102. A pair of transversely extending ladder rails 104 extends between rails 102. One end of each rail 102 is provided with a pair of pillow block bearings 106 flange-mounted at 108 to the opposite vertical sides of each frame rail 102. A transverse pair of pivot supports 103 extends between rails 104, the supports 103 being substantially equally spaced from their respective frame rails 102. Supports 103 are spaced apart to receive between them the outer end 105 of the piston rod 107 of jack 86. The outer end 105 of the piston rod 107 is pivotally mounted to supports 103 by a pivot pin 109.

The bearings 106 mounted on each rail 102 define between them a space 110 wide enough to receive the ear 79 provided on a respective frame rail 76. Pivot pins 112 extend through respective bearings 106 and ears 79 to mount the upper frame rail 102 assembly pivotally from the lower frame rail 78 assembly. The ends of frame rails 102 remote from the pivotal 112 mountings of rails 102 from rails 78 are provided with upwardly extending trunnion 26-receiving blocks 114. Each block 114 includes an upwardly opening, generally U-shaped cutout 115 for receiving a respective trunnion 26. A maneuvering handle 120 is mounted at its ends to rails 102 and extends upwardly above rails 102.

In operation, once a drum 12 of powdered coating material is sealed into the drum stand 14 as previously described, the elevator 16 is maneuvered into position with cutouts 115 beneath trunnions 26. Jack 86 is then operated to raise rails 102 until drum stand 14 and drum 12 are lifted from the surface on which they were resting. A typical powdered coating material-containing drum weighs between about 250 and about 800 pounds (about 114 to about 364 kilograms) and has about a three inch (about 7.6 cm) headspace. Thus, as the operator starts to pivot drum 12 and stand 14 about the axes of trunnions 26, as indicated by the broken lines 119 in FIG. 3, the drum stand 14 tends to tip itself on over until the hopper 34 is below the drum 12 and the legs 50 are adjacent the ground. Then the direction switch 96 is switched, releasing the previously pumped hydraulic fluid in jack 86 and setting the drum stand 14 down on legs 50. Powdered coating material thus fills the hopper 34 and the drum 12 to a height somewhat below the previous three-inch headspace owing to the volume of powdered coating material contained in the hopper 34.

Figure 1:
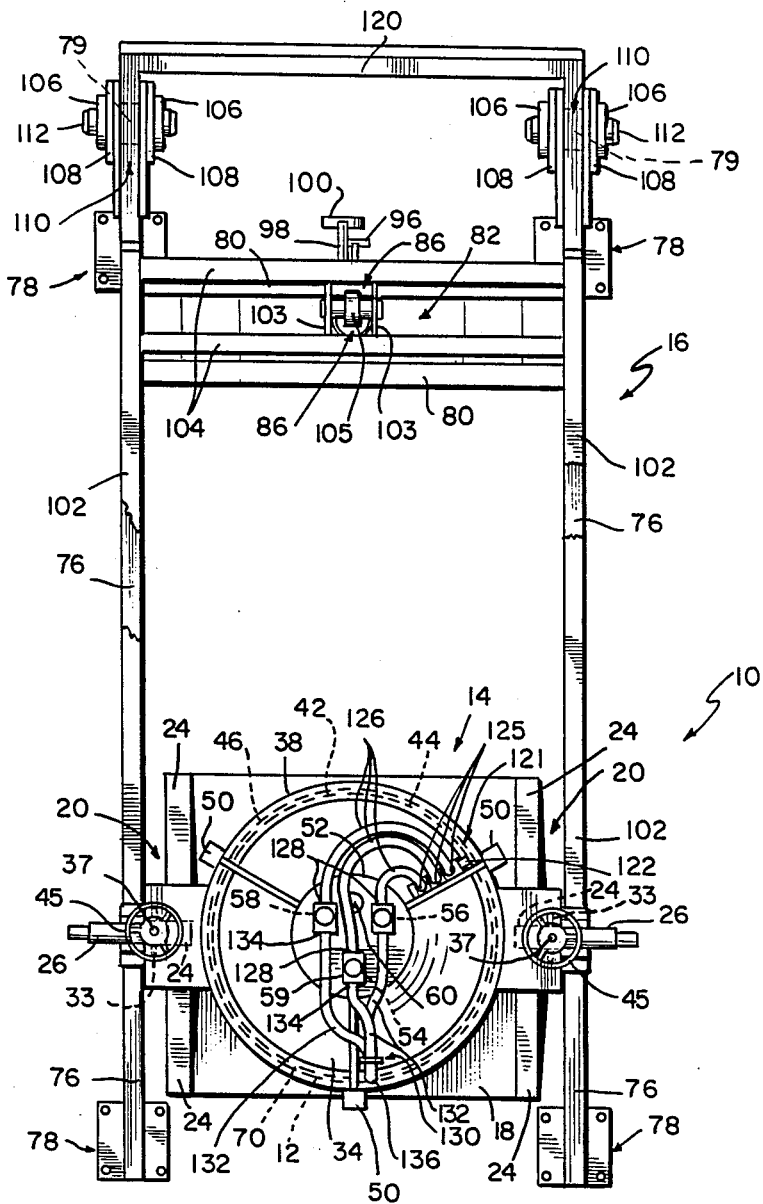
FIG. 1 illustrates a top plan view, partly in phantom, of a system constructed according to the present invention.

The delivery of powdered coating material from the thus-inverted drum 12 is facilitated by compressed air supplied through a manifold 121 (FIG. 1) mounted adjacent one of legs 50. Because the drum stand is inverted 180° during set-up prior to emptying, the connections to the drum 12 to be emptied are made as convenient as possible. Manifold 121 is provided with a quick-disconnect 122 which facilitates rapid coupling and uncoupling of the manifold 121 to a source of compressed air. The three outlets 125 from manifold 121 are coupled through suitable compressed air lines 126 to the inlets 128 of respective transfer pumps 59. For the same reason, three ¾" (approximately 1.9 cm) NPT-to-¾" inside diameter hose fittings 130 are provided adjacent one of legs 50. Three-fourth inch inside diameter powder conveying hoses 132 extend between the outlets 134 from pumps 59 and fittings 130, each of which is provided with nylon barb fittings 136 on its inlet and outlet sides. The nylon barb fittings 136 permit rapid coupling of powder transfer hoses which couple the flow of powder from hopper 34 through pumps 59, hoses 132 and the powder transfer hoses to a reclaim cannister or hopper associated with a powdered coating material dispensing system. If air cannot get through vent 60 and muffler 62 fast enough to prevent a partial vacuum from forming within drum 12, raising the possibility that the sidewall of drum 12 will collapse as the drum is emptied, a fitting for additional compressed air can be provided at vent 60 to force air into the drum 12 and prevent collapse.

Because there may be some slight misalignment between the drum stand 14 and the elevator 16 during the process of engaging drum stand 14, drum stand 14 is provided with gussets 150 (FIG. 2) having sloping guide surfaces 152 adjacent trunnions 26. These surfaces 152 guide blocks 114 into engagement with the trunnions 26 and prevent blocks 114 from engaging sections 28, which would prevent inversion of drum stand 14.

What is claimed is:

1. A drum- or barrel-unloader comprising a stand for supporting the drum or barrel in right side up and inverted orientations, the stand including a hopper for receiving the drum or barrel contents when the drum or barrel is inverted with its lid open and means for mounting the hopper for adjustment between first and second positions, the first position away from the top of the drum or barrel to permit placement of the drum or barrel in, and removal of the drum or barrel from, the stand and the second position in engagement with the top of the drum or barrel to receive the contents of the drum or barrel when the drum or barrel is placed in the stand and inverted, the unloader further comprising an elevator for engaging and raising the stand, one of the stand and elevator comprising at least one trunnion and the other of the stand and elevator comprising at least one block for engaging the at least one trunnion, operation of the elevator causing the engagement of the at least one trunnion and at least one block to suspend the stand pivotally from the elevator so that the stand and the drum or barrel supported by the stand can be inverted, subsequent disengagement of the elevator leaving the stand and the drum or barrel supported therein in inverted orientation, the elevator comprising a first frame portion and a second frame portion, means for pivotally mounting the second frame portion relative to the first frame portion, the pivotal mounting means comprising means defining a generally horizontally extending pivot axis about which the second frame portion pivots relative to the first frame portion, means for mounting the one of the trunnion and the block for engaging the trunnion which is mounted on the elevator from the second frame portion, a jack, and means for mounting the jack between the first and second frame portions, actuation of the jack in a first direction pivoting the second frame portion relative to the first to elevate the one of the trunnion and the block for engaging the trunnion mounted on the second frame portion and actuation of the jack in a second direction pivoting the second frame portion relative to the first to lower the one of the trunnion and the block for engaging the trunnion mounted on the second frame portion.

2. The apparatus of claim 1 wherein the one of the stand and elevator comprising at least one trunnion comprises two generally coaxial trunnions and the one of the stand and elevator comprising at least one block for engaging the at last one trunnion comprises a block for engaging each of the two generally coaxial trunnions.

3. The apparatus of claim 2 wherein the stand comprises the two coaxial trunnions and the elevator comprises the two blocks.

4. The apparatus of claim 1 wherein the hopper comprises means defining an opening through a wall thereof, a transfer pump for transferring material from the hopper, means for coupling the transfer pump through the opening to the interior of the hopper, and means for actuating the transfer pump to transfer material from the hopper.

5. The apparatus of claim 4 and further comprising means defining a vent through a wall of the hopper, the vent for venting atmospheric pressure to the interior of the hopper.

6. The apparatus of claim 5 and further comprising a filter for permitting air flow and inhibiting material flow and means for coupling the filter to the vent, the filter preventing material flow out of the hopper through the vent.

7. A drum- or barrel-unloader comprising a stand for supporting the drum or barrel in right side up and inverted orientations, the stand including a hopper for receiving the drum or barrel contents when the drum or barrel is inverted with its lid open and means for mounting the hopper for adjustment between first and second positions, the first position away from the top of the drum or barrel to permit placement of the drum or barrel in, and removal of the drum or barrel from, the stand and the second position in engagement with the top of the drum or barrel to receive the contents of the drum or barrel when the drum or barrel is placed in the stand and inverted, the unloader further comprising an elevator for engaging and raising the stand, one of the stand and elevator comprising at least one trunnion and the other of the stand and elevator comprising at least one block for engaging the at least one trunnion, operation of the elevator causing the engagement of the at least one trunnion and at least one block to suspend the stand pivotally from the elevator so that the stand and the drum or barrel supported by the stand can be inverted, subsequent disengagement of the elevator leaving the stand and the drum or barrel supported therein in inverted orientation, the means for mounting the hopper on the stand for adjustment between the first and second positions including first means for providing gross adjustment of the hopper and second means for providing fine adjustment of the hopper, the means for providing gross adjustment of the hopper comprising a first channel section, a second channel section slidably engaging the first channel section, at least one of the first and second channel sections including a plurality of spaced holes and the other of the first and second channel sections including a for alignment with a selected one of the spaced holes, and means for insertion into the aligned holes in the first and second channel sections to permit gross adjustment of the hopper.

8. The apparatus of claim 7 wherein the means for providing gross adjustment of the hopper comprises two first channel sections and two second channel sections, each second channel section slidably engaging a respective first channel section, means for mounting each first channel section on the stand and means for mounting the second channel sections generally on opposite sides of the hopper.

9. The apparatus of claim 8 wherein the means for providing fine adjustment of the hopper comprises two threaded studs, means for mounting each threaded stud to extend from an end of a respective second channel section adjacent the hopper, means providing a hole on each of the generally opposite sides of the hopper, the threaded studs sized for insertion into the holes provided on the generally opposite sides of the hopper, and threaded means for engaging each stud, loosening and tightening of the threaded means on the studs against the means providing the holes on generally opposite sides of the hopper providing the fine adjustment of the hopper.

10. The apparatus of claim 7 wherein the one of the stand and elevator comprising at least one trunnion comprises two generally coaxial trunnions and the one of the stand and elevator comprising at least one block for engaging the at least one trunnion comprises a block for engaging each of the two generally coaxial trunnions.

11. The apparatus of claim 10 wherein the stand comprises the two coaxial trunnions and the elevator comprises the two blocks.

12. The apparatus of claim 7 wherein the hopper comprises means defining an opening through a wall thereof, a transfer pump for transferring material from the hopper, means for coupling the transfer pump through the opening to the interior of the hopper, and means for actuating the transfer pump to transfer material from the hopper.

13. The apparatus of claim 12 and further comprising means defining a vent through a wall of the hopper, the vent for venting atmospheric pressure to the interior of the hopper.

14. The apparatus of claim 13 and further comprising a filter for permitting air flow and inhibiting material flow and means for coupling the filter to the vent, the filter preventing material flow out of the hopper through the vent.

* * * * *

UNITED STATES PATENT AND TRADEMARK OFFICE
CERTIFICATE OF CORRECTION

PATENT NO. : 4,744,701

DATED : May 17, 1988

INVENTOR(S) : Thomas A. Chasteen

It is certified that error appears in the above-identified patent and that said Letters Patent is hereby corrected as shown below:

At column 3, line 38, please delete "(only illustrated in FIG. 3)";

At column 6, line 27, please delete "last" and insert therefor --least--; and

At column 7, line 14, after the word "a" (first occurrence), please insert --hole--.

Signed and Sealed this

First Day of November, 1988

*Attest:*

DONALD J. QUIGG

*Attesting Officer*  *Commissioner of Patents and Trademarks*